(12) United States Patent
Takagi (10) Patent No.: US 9,704,071 B2
(45) Date of Patent: Jul. 11, 2017

(54) PRINTING DEVICE, CONTROL METHOD OF A PRINTING DEVICE, AND STORAGE MEDIUM FOR MANAGING FONT PRINTOUTS

(71) Applicant: Seiko Epson Corporation, Tokyo (JP)

(72) Inventor: Akimasa Takagi, Asahi-mura (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 14/881,803

(22) Filed: Oct. 13, 2015

(65) Prior Publication Data

US 2016/0110146 A1   Apr. 21, 2016

(30) Foreign Application Priority Data

Oct. 17, 2014 (JP) .................. 2014-212329

(51) Int. Cl.
*G06F 3/12* (2006.01)
*G06K 15/02* (2006.01)

(52) U.S. Cl.
CPC .......... *G06K 15/02* (2013.01); *G06F 3/1208* (2013.01); *G06F 3/1257* (2013.01); *G06K 15/1802* (2013.01); *G06K 15/1825* (2013.01)

(58) Field of Classification Search
None
See application file for complete search history.

(56) References Cited

U.S. PATENT DOCUMENTS

| 2006/0069992 A1* | 3/2006 | Hodder | G06F 17/214 |
| | | | 715/262 |
| 2011/0122438 A1* | 5/2011 | Someya | G06F 3/1208 |
| | | | 358/1.15 |
| 2012/0206751 A1* | 8/2012 | Bradshaw | G06F 3/1208 |
| | | | 358/1.13 |

FOREIGN PATENT DOCUMENTS

| JP | 08-034142 A | 2/1996 |
| JP | 2014-166740 A | 9/2014 |
| JP | 2014-206712 A | 10/2014 |

* cited by examiner

*Primary Examiner* — Andrew H Lam
(74) *Attorney, Agent, or Firm* — Nutter McClennen & Fish LLP; John J. Penny, Jr.; Santiago Velez (57) ABSTRACT

Based on characteristics of the font type, the results of printing by a previous printer and the results of printing by a replacement printer are made the same or nearly the same. The control unit 15 of the printer 10 receives control data including font type information specifying a font type, and character identification information specifying a character or string. When the font type specified by the font type information is a specific type of font, the control unit 15 adjusts the size of the font data of the character specified by the character identification information based on an adjustment value read from adjustment information data KY stored by a storage unit 16, and controls a print unit 17 to print the character based on the adjusted font data.

20 Claims, 5 Drawing Sheets

| COORDINATE DATA | FONT TYPE INFORMATION (EX: FONT A) | CHARACTER SIZE INFORMATION (EX: 10 POINT) | CHARACTER IDENTIFICATION INFORMATION (EX: STRING ABC) |
|---|---|---|---|

FIG. 4

ADJUSTMENT INFORMATION DATA (KY)

| | ADJUSTMENT VALUE |
|---|---|
| FONT P | −30% |
| FONT Q | −20% |
| FONT R | −5% |
| FONT S | +3% |
| FONT T | −10% |
| FONT U | −15% |
| FONT V | +5% |
| FONT W | +15% |

−30%, −20% ← ADJUSTMENT VALUE INFORMATION

FIG. 5

PRINTING DEVICE, CONTROL METHOD OF A PRINTING DEVICE, AND STORAGE MEDIUM FOR MANAGING FONT PRINTOUTS

This application claims priority under 35 U.S.C. §119 to Japanese Patent Application No. 2014-212329 filed on Oct. 17, 2014, the entire disclosure of which is expressly incorporated by reference herein.

BACKGROUND

1. Technical Field

The present disclosure relates to a printing device, a control method of a printing device, and a storage medium.

2. Related Art

JP-A-H08-034142 describes a printing device that stores font data internally. When a print job that contains a command specifying the font type is received from a host computer or other control device, the printing device described in JP-A-H08-034142 prints the text using the internally stored font data.

There are many different types of fonts. When a printing device prints text based on font data such as described above, and the printer that is connected to the control device is replaced with a different printer, the appearance of printouts from the original printer and the appearance of printouts from the replacement printer may differ depending on characteristics of the particular type of font.

SUMMARY

An objective of the disclosure is to provide a printing device that prints characters based on font data and, based on a characteristic of the type of font, can produce printouts that are the same or nearly the same as the printouts produced by a printer that the printer of the disclosure replaces.

A printing device according to a preferred aspect of the invention includes a controller (control unit) able to emulate another printing device; a communication unit configured to communicate with a control device; a print unit configured to print on a recording medium; and a storage (storage unit) configured to store font data or data to generate font data for a plurality of font types, and adjustment value information specifying an adjustment value configured to make the size of the font data of a specific font type the same or nearly the same size as font data stored in the other printing device; the controller receiving control data including font type information specifying the font type and character identification information specifying a character, and when the font type information is determined to specify the specific font type, reading the adjustment value information and font data or data for generating font data for the character the character identification information specifies, generating font data of an adjusted size, and controlling the print unit to print.

Based on characteristics of the font type, this aspect of the invention makes the results of printing by a previous printer and the results of printing by a replacement printer the same or nearly the same.

In a printing device according to another aspect of the invention, the specific font type is a scalable font, data for generating font data for the scalable font is stored in the storage, and the controller reads the data for generating font data and generates the font data.

In a printing device according to another aspect of the invention, the specific font type is a font type in which the size of the font data is different for each font.

Thus comprised, the size of font data for characters in a variable-size font is adjusted using an adjustment value for printing so that the results of printing before and after the previous printer is replaced are the same or nearly the same.

Further preferably, the controller does not adjust the size of the font data when the received font type information indicates a bitmap font in which the size of the font data is the same for each font.

Thus comprised, the size of bitmap font characters is not adjusted so that the balance of the printout is not distorted before and after the printer is replaced.

In a printing device according to another aspect of the invention, when a command specifying changing an adjustment value is received, the controller changes the adjustment value of the adjustment value information the storage stores based on the command.

Thus comprised, adjustment values can be changed by outputting a command to the printing device so that the results of printing before and after the previous printer is replaced are the same or nearly the same.

Another aspect of the invention is a control method of a printing device configured to be able to emulate another printing device, including steps of: storing font data or data to generate font data for a plurality of font types, and adjustment value information configured to make the size of the font data of a specific font type the same or nearly the same size as font data stored in the other printing device; receiving control data including font type information specifying the font type and character identification information specifying a character; and when the font type information is determined to specify the specific font type, reading the adjustment value information and font data or data for generating font data for the character the character identification information specifies, generating font data of an adjusted size, and printing.

Based on characteristics of the font type, this aspect of the invention makes the results of printing by a previous printer and the results of printing by a replacement printer the same or nearly the same.

Another aspect of the invention is a storage medium storing a program controlling a printing device having a controller able to emulate another printing device, a communication unit configured to communicate with a control device, a print unit configured to print on a recording medium, and a storage configured to store font data or data to generate font data for a plurality of font types, and adjustment value information configured to make the size of the font data of a specific font type the same or nearly the same size as font data stored in the other printing device. The program causes the controller to receive control data including font type information specifying the font type and character identification information specifying a character; and when the font type information is determined to specify the specific font type, causes the controller to read the adjustment value information and font data or data for generating font data for the character the character identification information specifies, generate font data of an adjusted size, and control the print unit to print.

Based on characteristics of the font type, this aspect of the invention makes the results of printing by a previous printer and the results of printing by a replacement printer the same or nearly the same.

Other objects and attainments together with a fuller understanding of the invention will become apparent and appreciated by referring to the following description and claims taken in conjunction with the accompanying drawings.

DESCRIPTION OF EMBODIMENTS

A preferred embodiment of the present invention is described below with reference to the accompanying figures.

Figure 1:
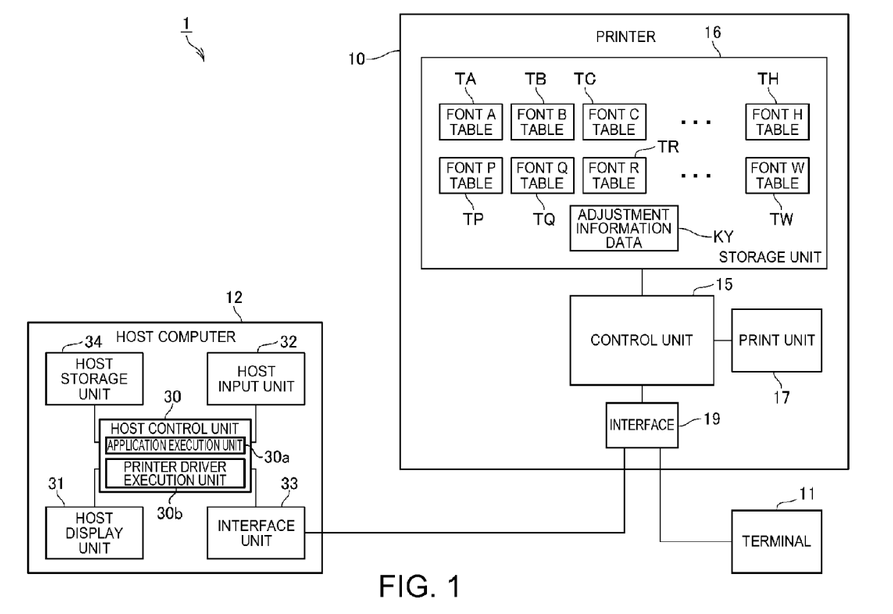
FIG. 1 is a block diagram illustrating the configuration of a printing system according to the invention.

FIG. 1 is a block diagram illustrating the functional configuration of a printing system 1 according to the invention.

As shown in FIG. 1, the printing system 1 includes a printer 10 (printing device), and a terminal 11 and a host computer 12 (control device) that communicatively connect to the printer 10.

The printer 10 is an inkjet printer, and can print in color. Label paper R can also be loaded in the printer 10 according to this embodiment.

Figure 2:
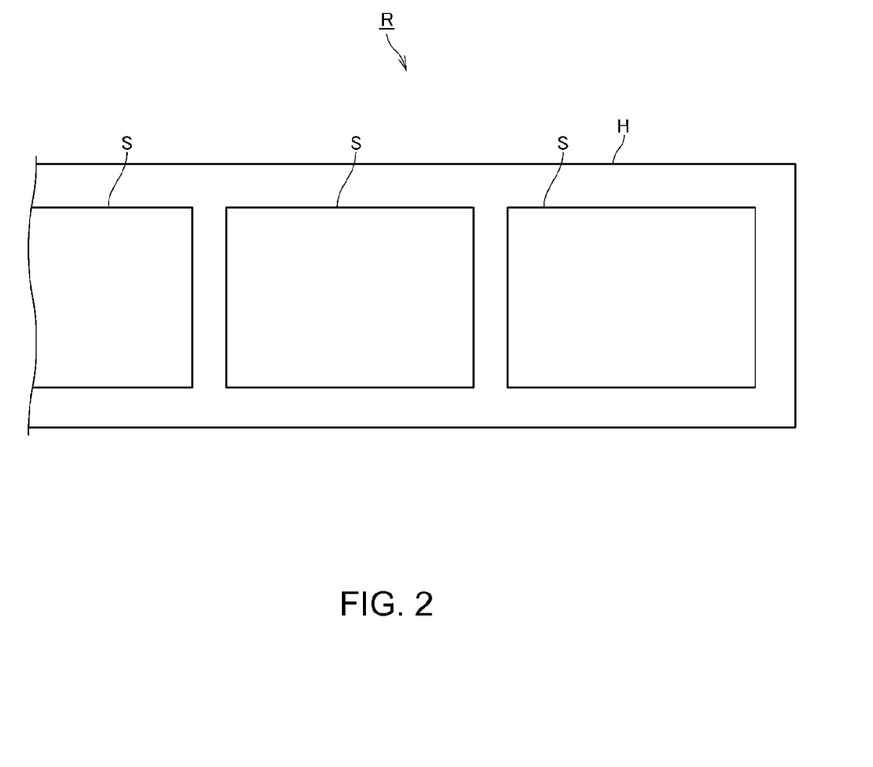
FIG. 2 illustrates label paper.

FIG. 2 shows an example of the label paper R. As shown in FIG. 2, the label paper R has labels S affixed at a regular interval to a continuous web liner H. The labels S have an adhesive coating on the back, and the labels S can be peeled from the waste matrix of the liner H surrounding the labels S.

The printer 10 can print continuously to the individual labels S on the liner H.

As shown in FIG. 1, the printer 10 has a control unit 15 (controller), a storage unit 16 (storage), a print unit 17, and an interface unit 19 (communication unit).

The control unit 15 includes a CPU, ROM, RAM, and other peripheral circuits, and controls the printer 10.

The storage unit 16 has nonvolatile memory, and stores data.

The storage unit 16 in this example stores eight font tables (font A table TA to font H table TH) for eight fonts, font A to font H.

Each of font A to font H is a bitmap font (fixed-size font). As known from the literature, a bitmap font is a font that expresses the shape of a character by a combination of a specific number of dots rendered in a matrix. For example, a bitmap font may be a font that expresses each character in the font by dots in a matrix 12 dots high by 12 dots wide.

A font table for each bitmap font (font A to font H) is a table storing font data for each character. In this embodiment of the invention, a character is identified by a character code, and characters include white space characters, symbols, and other glyphs to which a character code is assigned.

The storage unit 16 in this example also stores eight font tables (font P table TP to font W table TW) for another eight fonts, font P to font W.

Font P to font W are scalable fonts (variable-size fonts). A scalable font in this embodiment is a font that expresses the shape of a particular character by a set of points in a specific coordinate system and lines. In this embodiment of the invention, each font P table TP to font W table TW stores for each character the size of the character as an input parameter, and a function that outputs font data (below, a font data generator function). For a specific character in a specific font in the set of font P to font W, the control unit 15 uses the character size as a parameter to run the corresponding font data generator function and generate font data for the specific character.

Font A table TA to font H table TH, and font P table TP to font W table TW are examples of "font information."

The storage unit 16 also stores adjustment information data KY. This adjustment information data KY is described further below.

The print unit 17 includes a conveyance mechanism that conveys the label paper R described above or other recording medium, and a print mechanism that forms dots and prints images on the recording medium using an inkjet head. The print unit 17 drives the print mechanism and prints images on the label paper R while conveying the label paper R in the conveyance direction as controlled by the control unit 15.

The interface unit 19 communicates with the host computer 12 and terminal 11 according to a specific communication protocol as controlled by the control unit 15.

As shown in FIG. 1, the host computer 12 includes a host control unit 30, host display unit 31, host input unit 32, interface unit 33, and host storage unit 34.

The host control unit 30 has a CPU, ROM, RAM, and other peripheral circuits, and controls the host computer 12. Function blocks of the host control unit 30 include an application execution unit 30a and a printer driver execution unit 30b.

The application execution unit 30a is a function block rendered by running a previously installed application. The printer driver execution unit 30b is a function block rendered by running a previously installed printer driver. The application execution unit 30a and printer driver execution unit 30b are described further below.

The host display unit 31 has an LCD panel or other type of display panel, and displays information on the display panel as controlled by the host control unit 30.

The host input unit 32 is connected to a mouse, keyboard, touch panel, operating keys, or other type of input device, detects input to the input devices, and outputs to the host control unit 30.

The interface unit 33 communicates with the printer 10 according to a specific communication protocol as controlled by the host control unit 30.

The terminal 11 is a desktop, notebook, tablet, or other type of computer, or an information processing device such as a mobile terminal. A software tool with the functions described below is installed on the terminal 11.

In this example, a different printer was connected to the host computer 12 before the printer 10 according to the invention is connected.

This other printer that the printer of the invention replaces is referred to below as the "previous printer."

The printer 10 according to this embodiment is configured as described below and by executing the following process produces printouts that are the same or nearly the same as the printouts from the previous printer.

More specifically, the printer 10 according to this embodiment produces printouts that are the same or nearly the same as the printouts from the previous printer without needing to change the content of the control data the host computer 12 outputs when the printer 10 replaces the previous printer. As a result, there is no need to modify (reprogram) the host computer 12 when changing to the printer 10 of the invention.

The operation of the host computer 12 and printer 10 when printing text is described below.

Figure 3:
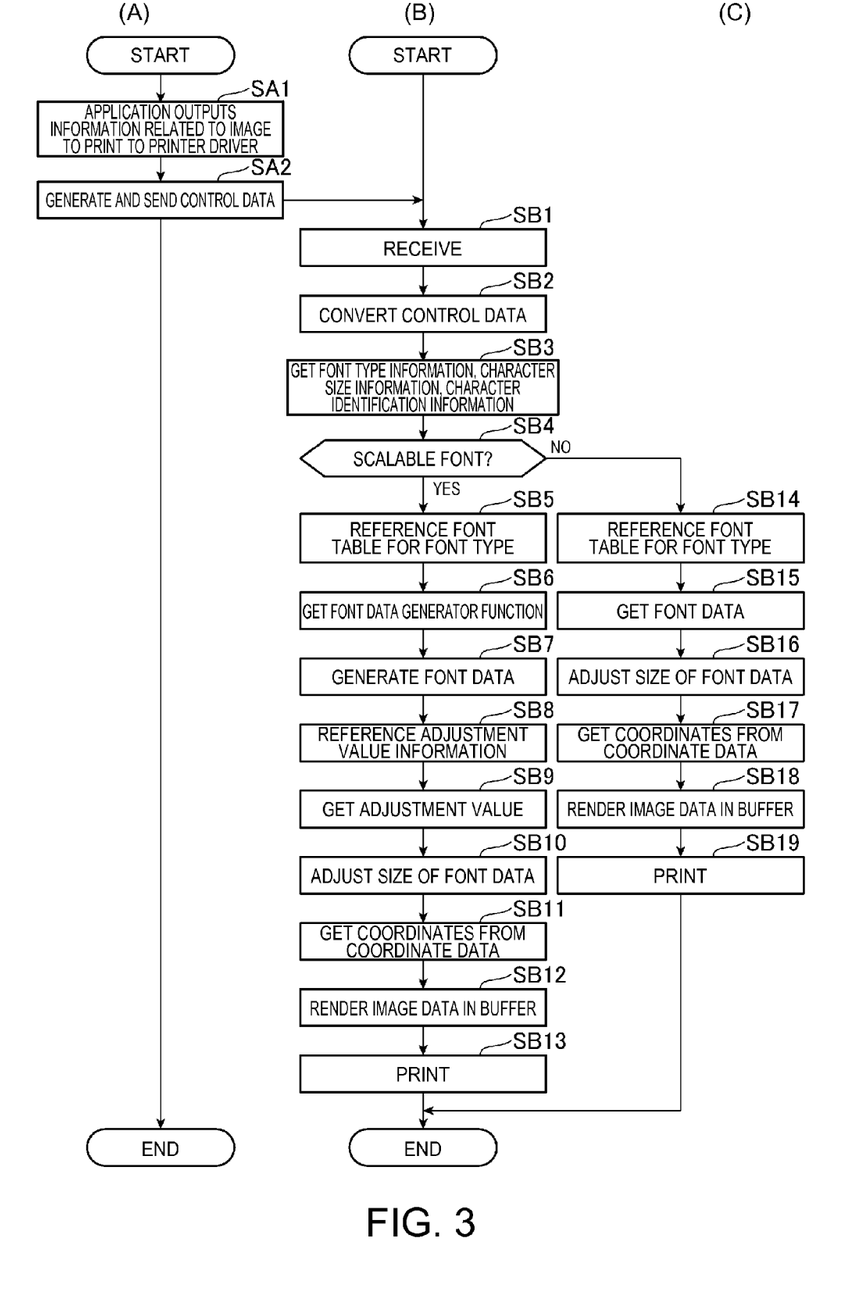
FIG. 3 is a flow chart of the operation of a host computer and a printing device.

FIG. 3 is a flow chart of the operation of the host computer 12 and printer 10 when printing text. Column (A) of FIG. 3 shows the operation of the host computer 12, and column (B) of FIG. 3 shows the operation of the printer 10.

The process of the printer 10 when printing the string ABC comprising the letter A, the letter B, and the letter C on a label S is described below.

As shown in column (A) of FIG. 3, the application execution unit 30a of the host computer 12 generates information related to an image to print, and outputs to the printer driver execution unit 30b (step SA1). The information related to the image to print includes information expressing the characters to print (the string ABC in this example), information expressing the size of the character when the character is printed, and information indicating where to print the character on the label S. Based on information input through a specific user interface, the application execution unit 30a generates the information related to the image to print.

Next, the printer driver execution unit 30b generates control data commanding printing text based on the information input from the application execution unit 30a, and outputs to the printer 10 (step SA2).

Note that when the device connected to the host computer 12 is changed from the previous printer to the printer 10 as described above, the application and printer driver installed on the host computer 12 are not changed. The control data generated and sent by the process of step SA2 is the same as the control data sent to the previous printer.

Figure 4:
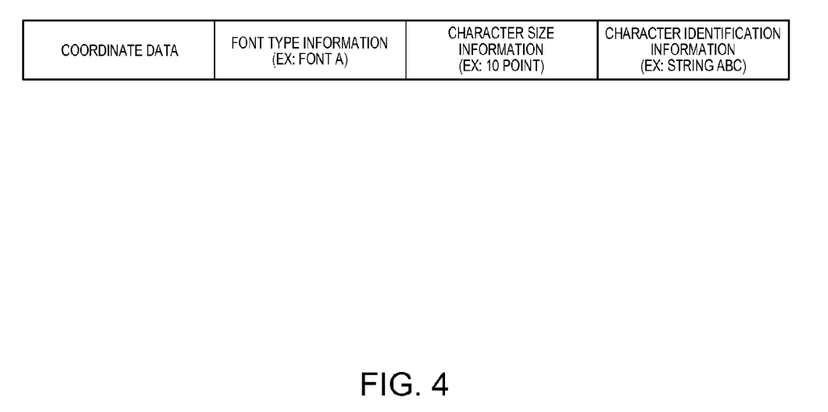
FIG. 4 shows the content of control data.

An example of the content of the information contained in the control data is shown in FIG. 4.

As shown in FIG. 4, the control data includes at least coordinate data, font type information, character size information, and character identification information.

The coordinate data is information specifying the coordinates for the position where the character is to be printed on the label S.

The font type information is information specifying the type of font. As described above, the printer 10 is compatible with font A to font H and font P to font W. The font type information is therefore information specifying a particular font A to font H or font P to font W.

Note that the previous printer is also compatible with font A to font H and font P to font W, and like the printer 10 of the invention stores a font table for each font.

The character size information is information specifying the size of the character to print. In this embodiment of the invention the character size is specified using points as the unit.

The character identification information is information specifying the character or the string to print. Each character is identified by a specific character code using Unicode or ASCII code, for example. In this example, the character identification information is information specifying the string ABC.

As shown in column (B) of FIG. 3, the control unit 15 of the printer 10 controls the interface unit 19 to receive control data (step SB1).

Next, the control unit 15 converts the received control data to control data conforming to the command language of the printer 10 (step SB2). Below, the control data output after being converted in step SB2 is referred to as the converted control data.

The control unit 15 has an emulation function for converting control data in the command language of the previous printer received from the host computer 12 to control data in the command language of the printer 10.

Next, the control unit 15 acquires the font type information, character size information, and character identification information contained in the converted control data (step SB3).

Next, the control unit 15 determines if the type of font (referred to below as the font type) identified by the font type information acquired in step SB3 is a scalable font (variable-size font) (that is, font P to font W) (step SB4).

If the font type is a scalable font (step SB4 returns YES), the control unit 15 references the font table for that font type (step SB5). For example, if the font type identified by the font type information is font P, the control unit 15 references the font P table TP step in SB5.

Next, the control unit 15 acquires the font data generator function of each character identified by the character identification information (the characters A, B, C in this example) acquired in step SB3 based on the font table referenced in step SB5 (step SB6).

Next, the control unit 15 generates font data for the characters identified by the character identification information using the character size parameter identified in the character size information acquired in step SB3 based on the font data generator function acquired in step SB6 (step SB7).

Next, the control unit 15 references the adjustment information data KY stored in the storage unit 16 (step SB8).

Figure 5:
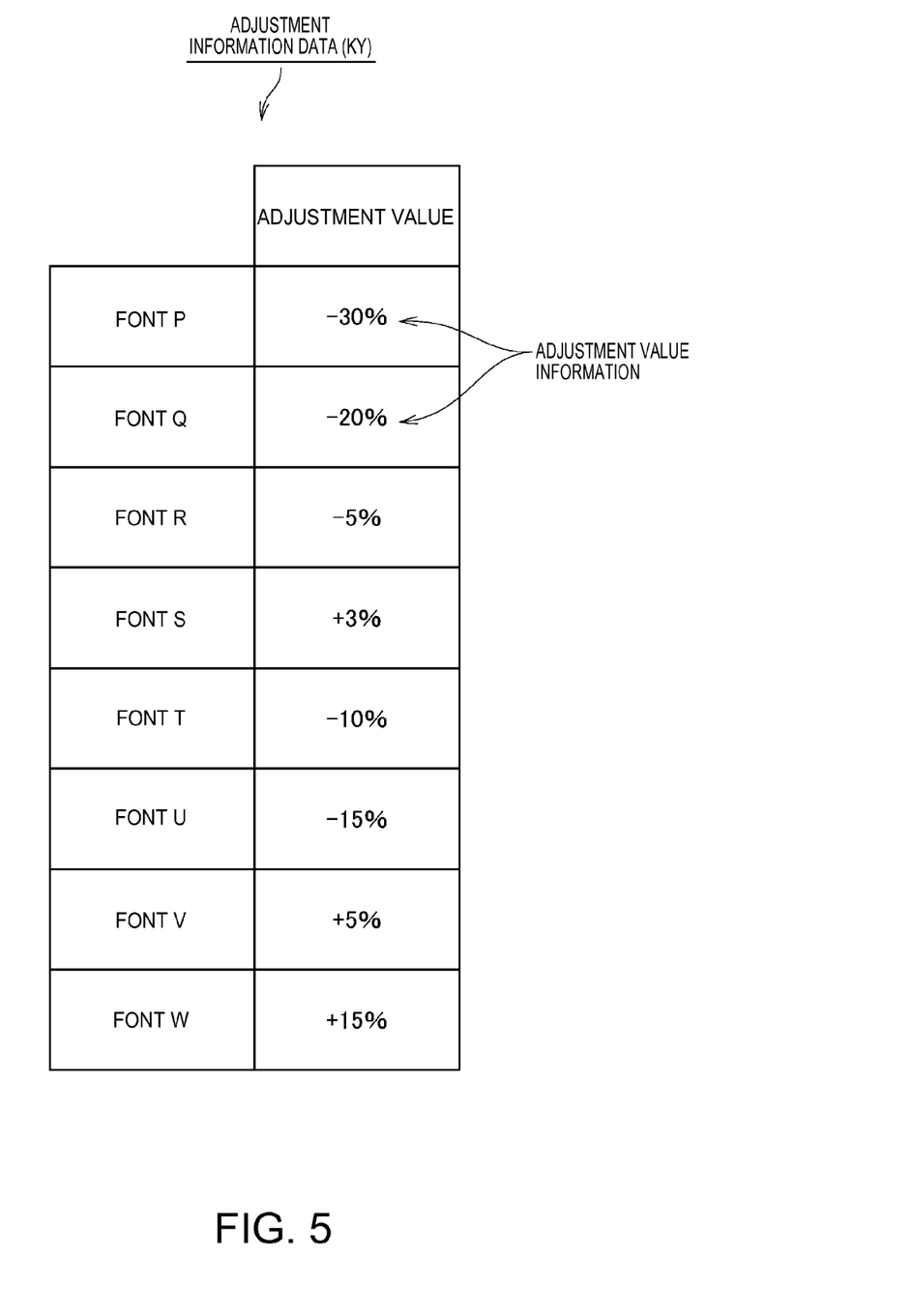
FIG. 5 shows an example of adjustment information data.

FIG. 5 shows an example of the adjustment information data KY.

As shown in FIG. 5, the adjustment information data KY is a table storing adjustment value information for each font P to font W.

The adjustment value information is information specifying an adjustment value. An adjustment value is information indicating the enlargement ratio or the reduction ration when enlarging or reducing the size of the font data. The range of adjustment values in this example is −99% to +99%.

Next, the control unit 15 acquires from the adjustment information data KY the adjustment value information corresponding to the font type specified by the font type information acquired in step SB3 (step SB9).

Next, the control unit 15 enlarges or reduces the font data for each character generated in step SB7 using the adjustment value specified by the adjustment value information acquired in step SB9 (that is, adjusts the size of the font data) (step SB10).

For example, if the font type specified by the font type information is font P, and the adjustment value for font P is −30%, the control unit 15 reduces the size of the font data 30%.

Note that the control unit 15 enlarges or reduces the font data based on the adjustment value by a specific process using the font data generator function for each character.

The values used as the adjustment values for font P to font W in the adjustment information data KY are set based on the results of previous tests or simulations for the reasons described below.

Specifically, the value of each adjustment value is set so that the size of the font data for one font type registered in the previous printer, and the size of the font data after enlargement or reduction (scaling) based on the adjustment value for the font data of the same single font type in the printer 10, are the same or nearly the same.

For example, as shown in FIG. 5, the adjustment value for font P in this example is −30%. In this event, by reducing the font data of font P registered in the printer 10 30%, the size of the reduced font data can be made the same or nearly the same size as the font data of the font P registered in the previous printer.

Next, the control unit 15 acquires the coordinates specified by the coordinate data contained in the converted control data (step SB11).

Next, the control unit 15 renders the font data (the font data for the characters A, B, C in this example) that was scaled based on the adjustment value information as image data at the position specified by the coordinates acquired in step SB11 in an image buffer not shown (step SB12).

Next, the control unit 15 controls the print unit 17 to print the characters based on the image data rendered in the image buffer (step SB13).

As described above, when the specified font type is a scalable font (variable-size font), the printer 10 adjusts (scales) the size of the corresponding font data based on the adjustment value previously set for that font, and prints the character based on the adjusted font data. As a result, when the fonts are the same, the size of the characters printed by the printer 10 and the size of the characters printed by the previous printer are the same. As a result, printouts that are the same or nearly the same when the printer 10 prints the text and when the previous printer prints the text can be produced.

A characteristic of a scalable font is that the shape of the characters is not easily distorted and the characters do not become jagged when the font data is scaled (enlarged or reduced). This embodiment of the invention can therefore produce printouts that are the same or nearly the same before and after the printer is replaced while also suppressing distortion of character shapes and jaggedness.

Unlike bitmap fonts, the size of the font data differs for each character in a scalable font. As a result, by adjusting the size of the font data using the adjustment values, the result when printing characters based on font data can be made the same or nearly the same before and after the printing device is replaced.

However, if the font type identified by the font type information is determined in step SB4 to not be a scalable font (step SB4:NO), that is, if the font type is a bitmap font (fixed-size font) (font A to font H) the control unit 15 executes the following process.

The control unit 15 first references the font table for the font type (step SB14). For example, if the font type information indicates the font type is font A, in step SB14 the control unit 15 references font A table TA.

Next, based on the font table referenced in step SB15, the control unit 15 acquires the font data for the characters (characters A, B, C in this example) specified by the character identification information acquired in step SB3 (step SB15).

For each character code in each bitmap font, the storage unit 16 stores a conversion table that relationally stores the character code and the address of the storage area where the font data of the character identified by the character code is stored in the font table. In step SB15, the control unit 15 uses this conversion table to acquire the font data for each character.

Next, the control unit 15 enlarges or reduces the font data acquired for each character in step SB15 according to the size of the character indicated by the character size information acquired in step SB3 (step SB16).

Font data for a bitmap font is appropriately scaled by a known image process related to enlarging and reducing font data.

Next, the control unit 15 acquires the coordinates specified by the coordinate data contained in the converted control data (step SB17).

Next, the control unit 15 renders the font data (the font data for the characters A, B, C in this example) that was scaled based on the character size indicated by the character size information as image data at the position specified by the coordinates acquired in step SB17 in an image buffer not shown (step SB18).

Next, the control unit 15 controls the print unit 17 to print the characters based on the image data rendered in the image buffer (step SB19).

The size of the font data for each font (font A to font H) of the bitmap fonts registered in the previous printer, and the size of the font data for each font (font A to font H) of the bitmap fonts registered in the printer 10 of the invention, are the same. More specifically, a font table storing font data of the same size as in the previous printer is created and registered in the printer 10 for each font A to font H when the printer 10 is manufactured.

As a result, characters based on font data for a bitmap font are printed the same or nearly the same size by the previous printer and the printer 10 of the invention without needing to adjust the size of the font data with an adjustment value.

The printer 10 according to this embodiment and the previous printer can thus match the size of font data for corresponding font types without adjusting the size of the font data based on an adjustment value.

The reason for this is described below.

When font data for a bitmap font is enlarged or reduced, the shape of the characters is easily distorted and the characters tend to become jagged when the font data is scaled (enlarged or reduced). Adjusting the size of the font data based on an adjustment value is therefore not desirable.

Furthermore, the size of font data for a bitmap font is fixed for each font. As a result, when creating a font table corresponding to the font table of the previous printer when the printer 10 is manufactured, there is no need to change the size of the font data in any single font table, and font data of a fixed size can be stored in the font table. A font table matching the font table registered in the previous printer can therefore be easily created when the printer 10 is manufactured.

As a result, the size of the font data for corresponding bitmap fonts can be matched in the printer 10 and the previous printer, and the size of the font data is not adjusted based on an adjustment value.

A process for changing the adjustment values of the adjustment value information in the adjustment information data KY is described next.

The adjustment values of specific adjustment value information in the adjustment information data KY of the printer 10 can be changed in this embodiment by sending a specific command from the terminal 11.

More specifically, as described above, a specific software tool is installed on the terminal 11. This software tool provides a user interface that enables inputting a font and the adjustment value (the adjustment value after being changed) of the adjustment value information for that font for scalable fonts. Through this user interface, the use inputs the font for which the adjustment value is to be changed, and the new adjustment value to use after the adjustment value is changed.

By another function of this software tool, the terminal 11 generates and sends a command including information specifying the font and the new adjustment value to the printer 10.

The control unit 15 of the printer 10 then receives the command sent from the terminal 11.

Next, the control unit 15 accesses the adjustment information data KY stored in the storage unit 16, and based on the received command changes the adjustment value of the adjustment value information related to the specified font to the specified new adjustment value.

This embodiment of the invention can thus change the adjustment values of the adjustment value information in the adjustment information data KY. As a result, the value of the adjustment value can be changed based on the actual printing results, and printouts from the printer 10 can be made the same or nearly the same as the previous printer.

As described above, a printer 10 according to this embodiment has a storage unit 16 that stores a font table (font information) and adjustment information data KY for plural different fonts; and a control unit 15 that receives control data including font type information specifying the type of font, and character identification information specifying the characters to print, and when the type of font specified by the font type information is a specific type of font, adjusts the size of the font data of the characters specified by the character identification information based on the adjustment values specified by the adjustment information data KY stored in the storage unit 16, and controls the print unit 17 to print the characters based on the font data after the size is adjusted.

Thus comprised, the printer 10 adjusts the size of font data based on an adjustment value for characters of a specific font type, and prints characters based on the font data after the size is adjusted, and can therefore produce printouts that are the same or nearly the same as the printouts before the printer 10 replaced the previous printer.

The storage unit 16 in this embodiment of the invention stores font tables for bitmap fonts (fixed-size fonts), and font tables for scalable fonts (variable-size fonts). When control data containing font type information specifying a scalable font as the type of font is received, the control unit 15 adjusts the size of the font data based on the adjustment value retrieved from an adjustment information data KY stored in the storage unit 16.

Thus comprised, by adjusting the size of font data using an adjustment value for characters in a scalable font when printing text, printouts that are the same or nearly the same before and after the printer 10 replaces a previous printer can be produced.

When a command specifying changing the adjustment value is received, the control unit 15 in this embodiment changes the adjustment value in the adjustment information data KY stored by the storage unit 16 based on the command.

Thus comprised, adjustment values can be desirably changed, and printouts produced by the printer 10 can be made the same or nearly the same as the printouts from the previous printer.

The invention is described above with reference to a preferred embodiment thereof, but the invention is not limited thereto and can be modified and adapted in many ways without departing from the scope of the accompanying claims.

For example, the embodiment described above stores adjustment values for each scalable font, font P to font W. Depending on the characteristics of the fonts P to W in the previous printer and the printer 10, however, a configuration in which a single (same) adjustment value is used for font P to font W is also conceivable.

A scalable font is used as an example of a variable-size font in the foregoing embodiment. However, variable-size fonts are not limited to scalable fonts. A variable-size font is any font type other than font type for which the font data is fixed for each character in the single font type, such as a bitmap font, and may be a proportional font, stroke font, or outline font, for example.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

What is claimed is:

1. A printing device comprising:
   a controller configured to receive control data and to generate print data based on the received control data;
   an interface unit configured to communicate with a control device;
   a print unit configured to print on a recording medium; and
   a storage configured to store font data or data to generate font data for a plurality of font types, and adjustment value information configured to change the size of the font data of a specific font type; wherein
   the controller receives the control data including font type information specifying the font type and character identification information specifying a character, and
      when the font type information specifies the specific font type, the controller reads the stored adjustment value information and the font data or the data for the specific font type according to the character identification information, generates the print data including print font data of an adjusted size based at least in part on the adjustment value information, and controls the print unit to print based on the generated print data.

2. The printing device described in claim 1, wherein:
   the specific font type is a scalable font,
   data for generating font data for the scalable font is stored in the storage, and
   the controller reads the data for generating font data and generates the font data.

3. The printing device described in claim 1, wherein:
   the specific font type is a font type in which the size of the font data is different for each font.

4. The printing device described in claim 1, wherein:
   the controller does not adjust the size of the font data when the received font type information indicates a bitmap font in which the size of the font data is the same for each font.

5. The printing device described in claim 1, wherein:
   when a command specifying changing an adjustment value is received, the controller changes the adjustment value of the stored adjustment value information based on the command.

6. The printing device described in claim 1, wherein:
   the adjustment value is information indicating an enlargement or reduction ratio for enlarging or reducing, respectively, the font data, and
   the adjustment value information is in the range +99% to −99% of the size of the font data.

7. The printing device described in claim 1, wherein:
   the controller emulates another printing device, and the size of the font of the specific font type in a printout printed by the print unit is the same or nearly the same size as the font in a printout printed by the other printing device.

8. The printing device described in claim 1, wherein:
the controller emulates another printing device, and
the stored adjustment value information is configured to make the size of the font data of a specific font type the same or nearly the same size as font data stored in the other printing device.

9. A control method of a printing device configured to receive control data and to generate print data based on the received control data:
storing font data or data to generate font data for a plurality of font types, and adjustment value information configured to change the size of the font data of a specific font type; wherein
receiving the control data including font type information specifying the font type and character identification information specifying a character; and
when the font type information specifies the specific font type, reading the stored adjustment value information and the font data or the data for the specific font type according to the character identification information, generating the print data including print font data of an adjusted size based at least in part on the adjustment value information, and controlling the printing based on the generated print data.

10. The control method of a printing device described in claim 9, wherein:
the specific font type is a scalable font; and
data for generating font data for the scalable font is stored in a storage;
the control method including reading the data for generating font data and generating the font data.

11. The control method of a printing device described in claim 9, wherein:
the specific font type is a font type in which the size of the font data is different for each font.

12. The control method of a printing device described in claim 9, wherein:
the size of the font data is not adjusted when the received font type information indicates a bitmap font in which the size of the font data is the same for each font.

13. The control method of a printing device described in claim 9, further comprising:
changing the adjustment value of the stored adjustment value information based on the received command when a command specifying changing an adjustment value is received.

14. The control method of a printing device described in claim 9, wherein:
the adjustment value is information indicating an enlargement or reduction ratio for enlarging or reducing, respectively, the font data, and the adjustment value information is in the range +99% to −99% of the size of the font data.

15. A non-transitory storage medium storing a program controlling a printing device having a controller configured to receive control data and to generate print data based on the received control data,
interface unit configured to communicate with a control device,
a print unit configured to print on a recording medium, and
a storage configured to store font data or data to generate font data for a plurality of font types, and adjustment value information configured to change the size of the font data of a specific font type, wherein
the program causing the controller to receive the control data including font type information specifying the font type and character identification information specifying a character; and
when the font type information specifies font type, the controller reads the stored adjustment value information and the font data or the data for the specific font type according to the character identification information, generates the print data including print font data of an adjusted size based at least in part on the adjustment value information, and controls the print unit to print based on the generated print data.

16. The non-transitory storage medium storing a program described in claim 15, wherein:
the specific font type is a scalable font; and
data for generating font data for the scalable font is stored in the storage;
the program causing the controller to read the data for generating font data and generate the font data.

17. The non-transitory storage medium storing a program described in claim 15, wherein:
the specific font type is a font type in which the size of the font data is different for each font.

18. The non-transitory storage medium storing a program described in claim 15, further comprising:
the program causing the controller to not adjust the size of the font data when the received font type information indicates a bitmap font in which the size of the font data is the same for each font.

19. The non-transitory storage medium storing a program described in claim 15, further comprising:
the program causing the controller to change the adjustment value of the adjustment value information the storage stores based on the received command when a command specifying changing an adjustment value is received.

20. The non-transitory storage medium storing a program described in claim 15, wherein:
the adjustment value information is in the range +99% to −99% of the size of the font data.

* * * * *